US008020089B1

(12) United States Patent
Brichford et al.

(10) Patent No.: US 8,020,089 B1
(45) Date of Patent: Sep. 13, 2011

(54) RENDERING HYPERTEXT MARKUP LANGUAGE CONTENT

(75) Inventors: Christopher Brichford, Menlo Park, CA (US); Brent E. Rosenquist, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1143 days.

(21) Appl. No.: 11/773,924

(22) Filed: Jul. 5, 2007

Related U.S. Application Data

(63) Continuation-in-part of application No. 11/585,661, filed on Oct. 23, 2006, now Pat. No. 7,614,003.

(51) Int. Cl.
*G06F 3/048* (2006.01)

(52) U.S. Cl. .......................... 715/234; 715/239; 715/760

(58) Field of Classification Search .................. 715/234, 715/239, 760
See application file for complete search history.

(56) References Cited

U.S. PATENT DOCUMENTS

| 5,511,217 | A | 4/1996 | Nakajima et al. | |
| 5,987,256 | A * | 11/1999 | Wu et al. ........................ | 717/146 |
| 6,415,278 | B1 | 7/2002 | Sweet et al. | |
| 6,558,431 | B1 | 5/2003 | Lynch et al. | |
| 6,675,230 | B1 | 1/2004 | Lewallen | |
| 6,687,745 | B1 | 2/2004 | Franco et al. | |
| 6,801,224 | B1 | 10/2004 | Lewallen | |
| 6,812,941 | B1 | 11/2004 | Brown et al. | |
| 6,865,599 | B2 | 3/2005 | Zhang | |
| 6,873,343 | B2 | 3/2005 | Chui | |
| 6,922,200 | B1 | 7/2005 | Marques | |
| 7,088,374 | B2 * | 8/2006 | David et al. ................... | 345/619 |
| 7,117,504 | B2 | 10/2006 | Smith et al. | |
| 7,158,878 | B2 | 1/2007 | Rasmussen et al. | |
| 7,161,599 | B2 | 1/2007 | Beda et al. | |
| 7,210,095 | B1 | 4/2007 | Mor | |
| 7,257,771 | B2 | 8/2007 | Buser et al. | |
| 7,265,756 | B2 | 9/2007 | Schneider et al. | |
| 7,287,274 | B1 | 10/2007 | Houlding | |
| 7,340,718 | B2 | 3/2008 | Szladovics et al. | |
| 7,430,343 | B2 | 9/2008 | Hayes et al. | |
| 7,486,294 | B2 * | 2/2009 | Beda et al. .................... | 345/473 |
| 7,546,607 | B2 | 6/2009 | Demsey et al. | |
| 7,614,003 | B2 | 11/2009 | Brichford et al. | |
| 7,836,148 | B2 * | 11/2010 | Popp et al. .................... | 709/217 |
| 2001/0032221 | A1 | 10/2001 | Anwar | |
| 2002/0109729 | A1 | 8/2002 | Dutta | |
| 2003/0101235 | A1 | 5/2003 | Zhang | |

(Continued)

OTHER PUBLICATIONS

"About the Browser", downloaded from the internet on Oct. 10, 2006 at http://msdn.microsoft.com/workshop/browser/overview/Overview.asp?frame=true, 6 pages.

(Continued)

*Primary Examiner* — Weilun Lo
*Assistant Examiner* — Anil Bhargava
(74) *Attorney, Agent, or Firm* — Fish & Richardson P.C.

(57) ABSTRACT

Methods, systems, and apparatus, including medium-encoded computer program products, for rendering hypertext markup language content. In one aspect, a method includes receiving a document specifying a hierarchy of HTML elements, each HTML element having a representation in a first visual representation of the document; translating the HTML elements into a hierarchy of vector object primitives, at least one of the HTML elements being translated into a corresponding vector object primitive; and generating the first visual representation of the document by rendering the hierarchy of vector object primitives.

25 Claims, 6 Drawing Sheets

U.S. PATENT DOCUMENTS

| | | | |
|---|---|---|---|
| 2003/0121000 A1 | 6/2003 | Cooper et al. | |
| 2004/0056894 A1 | 3/2004 | Zaika et al. | |
| 2004/0098731 A1 | 5/2004 | Demsey et al. | |
| 2004/0111672 A1 | 6/2004 | Bowman et al. | |
| 2004/0111673 A1 | 6/2004 | Bowman et al. | |
| 2004/0148571 A1* | 7/2004 | Lue | 715/514 |
| 2004/0189667 A1 | 9/2004 | Beda et al. | |
| 2004/0189669 A1 | 9/2004 | David et al. | |
| 2004/0194020 A1* | 9/2004 | Beda et al. | 715/502 |
| 2004/0223009 A1 | 11/2004 | Szladovics et al. | |
| 2005/0146533 A1 | 7/2005 | Sanborn et al. | |
| 2005/0268216 A1 | 12/2005 | Hayes et al. | |
| 2006/0005114 A1* | 1/2006 | Williamson et al. | 715/502 |
| 2006/0010246 A1 | 1/2006 | Schulz et al. | |
| 2006/0026526 A1 | 2/2006 | Simister et al. | |
| 2006/0048051 A1 | 3/2006 | Lazaridis | |
| 2006/0103665 A1 | 5/2006 | Opala et al. | |
| 2006/0112167 A1 | 5/2006 | Steele et al. | |
| 2006/0123360 A1 | 6/2006 | Anwar et al. | |
| 2006/0152511 A1 | 7/2006 | Whatmough | |
| 2007/0013697 A1 | 1/2007 | Gilboa | |
| 2007/0089048 A1 | 4/2007 | Lacey et al. | |
| 2007/0094672 A1 | 4/2007 | Hayton et al. | |
| 2007/0113237 A1 | 5/2007 | Hickson | |
| 2007/0192818 A1 | 8/2007 | Bourges et al. | |
| 2007/0198918 A1 | 8/2007 | Mor | |
| 2007/0256055 A1 | 11/2007 | Herscu | |
| 2007/0288855 A1 | 12/2007 | Rohrabaugh et al. | |
| 2008/0082907 A1 | 4/2008 | Sorotokin et al. | |

OTHER PUBLICATIONS

"An Introductory Look at Windows Presentation Foundation: Part 1, Getting the Beta Tools", downloaded from the internet on Sep. 6, 2006 at http://www.devsource.com/article2/0,1895,1965449,00.asp, 4 pages.

"An Introductory Look at Windows Presentation Foundation: Part 1, Layout Containers", downloaded from the internet on Sep. 6, 2006 at http://www.devsource.com/article2/0,1895,1965450,00.asp, 4 pages.

"Windows Presentation Foundation", downloaded from the internet on Oct. 16, 2006 at http://msdn2.microsoft.com/en-us/netframework/aa663326(d=printer).aspx, 4 pages.

"XML User Interface Language (XUL) Project", downloaded from the internet on Oct. 16, 2006 at http://mozilla.org/projects/xul, 1 page.

Aitken, "An Introductory Look at Windows Presentation Foundation: Part 1", May 21, 2006, ownloaded from the internet on Sep. 6, 2006 at http://www.devsource.com/article2/0,1895,1965448,00.asp, 2 pages.

Bojanic, "The Joy of XUL", downloaded from the internet on Oct. 16, 2006 at http://developer.mozilla.org/en/docs/The_Joy_of_XUL, 5 pages.

Roberts, "Take Total Control of Internet Explorer with Advanced Hosting Interfaces", Oct. 1998, downloaded from the internet on Oct. 10, 2006 at http:/www.microsoft.com/mind/1098/advhost/advhost.asp, 9 pages.

Theriault, Steven B., Authorized Officer, International Search Report dated Jul. 7, 2008, in related PCT Application No. PCT/US07/81680, 8 pages.

U.S. Appl. No. 11/585,661, Office Action dated Jun. 26, 2008, 12 pages.

U.S. Appl. No. 11/585,661, Notice of Allowance dated Jun. 26, 2009, 8 pages.

Valentino, Joseph, Attorney for Applicant, Fish & Richardson, U.S. Appl. No. 11/585,661, filed Oct. 23, 2006, Response submitted Sep. 26, 2008, 11 pages.

Valentino, Joseph, Attorney for Applicant, Fish & Richardson, U.S. Appl. No. 11/585,661, filed Oct. 23, 2006, Response submitted Feb. 18, 2009, 10 pages.

Valentino, Joseph, Attorney for Applicant, Fish & Richardson, U.S. Appl. No. 11/585,661, filed Oct. 23, 2006, Pre-Appeal Brief Request for Review, submitted Apr. 2, 2009, 5 pages.

U.S. Appl. No. 11/585,661, Advisory Action dated Mar. 9, 2009, 3 pages.

U.S. Appl. No. 11/585,661, Office Action dated Dec. 18, 2008, 11 pages.

* cited by examiner

RENDERING HYPERTEXT MARKUP LANGUAGE CONTENT

CROSS-REFERENCE TO RELATED APPLICATIONS

This application is a continuation-in-part of and claims the benefit of priority to U.S. patent application Ser. No. 11/585,661, entitled RENDERING HYPERTEXT MARKUP LANGUAGE CONTENT, to Christopher Brichford et al., filed on Oct. 23, 2006, now issued U.S. Pat. No. 7,614,003, which is related to U.S. patent application Ser. No. 11/512,764, entitled SOFTWARE INSTALLATION AND SUPPORT, to O. Goldman et al., filed on Aug. 29, 2006, now U.S. Publication No. 2008/0127170; and this application is related to U.S. patent application Ser. No. 11/773,914, entitled BRIDGING SCRIPT ENGINES, to C. Brichford, filed on the same day as the present application; all of which are hereby incorporated by reference.

BACKGROUND

The present disclosure relates to rendering hypertext markup language (HTML) content. HTML is an authoring language commonly used to create documents on the World Wide Web. HTML defines the structure and layout of a Web document using a variety of tags and attributes, which an HTML rendering engine interprets when processing HTML content. The structure and layout defined by the HTML in a Web document can be used to generate a hierarchy of HTML elements. Typically, a Web browser employs an HTML rendering engine to rasterize the hierarchy of HTML elements to a display device.

SUMMARY

This specification describes technologies relating to rendering hypertext markup language content. In general, one or more aspects of the subject matter described in this specification can be embodied in one or more methods that include receiving a document specifying a hierarchy of HTML elements, each HTML element having a representation in a first visual representation of the document; translating the HTML elements into a hierarchy of vector object primitives, at least one of the HTML elements being translated into a corresponding vector object primitive; and generating the first visual representation of the document by rendering the hierarchy of vector object primitives. Other embodiments of this aspect include corresponding systems, apparatus, and computer program products.

These and other embodiments can optionally include one or more of the following features. The method can include receiving a requested modification to the hierarchy of HTML elements, the requested modification to the hierarchy of HTML elements representing a second visual representation of the document; modifying the hierarchy of vector object primitives based on the one or more modifications; and generating the second visual representation of the document by rendering the hierarchy of vector object primitives. Generating the second visual representation of the document by rendering the hierarchy of vector object primitives can include rendering only that portion of the hierarchy of vector object primitives affected by the requested modification.

Modifying the hierarchy of vector object primitives can include: identifying HTML elements in the hierarchy of HTML elements affected by the requested operation; and modifying the vector object primitives in the hierarchy of vector objects primitives corresponding to the HTML elements in the hierarchy of HTML elements that would be affected by the requested operation. Modifying the hierarchy of vector object primitives can include: adding a clipping region to the hierarchy of vector object primitives, the clipping region preventing the vector object primitives affected by the requested modification from having a representation in the second visual representation of the document; adding new vector object primitives to the hierarchy of vector object primitives, the new vector object primitives corresponding to the HTML elements affected by the requested operation; and using the new vector object primitives for generating the second visual representation.

The method can include receiving a request to modify a vector object primitive in the hierarchy of vector object primitives; in response to the request, modifying the vector object primitive; and generating a second visual representation using the hierarchy of vector object primitives. The method can include ordering the vector object primitives in the hierarchy of vector object primitives based on relative depth, a first vector object primitive in the hierarchy being above or under a second vector object primitive in the hierarchy; inserting a third vector object primitive into the hierarchy of vector object primitives, the third vector object primitive being under at least one vector object primitive in the hierarchy, the third vector object primitive being specified in a document different from the document specifying the hierarchy of HTML elements; and generating a second visual representation using the third vector object primitive and the hierarchy of vector object primitives, a representation of the third vector object primitive in the second visual representation being at least partially occluded by a representation of the at least one vector object primitive in the hierarchy.

The method can include translating a respective position of each of the vector object primitives based on a position of a viewport, the position of the viewport being relative to a position of the vector objects. Moreover, the method can include identifying a declaration for generating the first visual representation of the document without a background; and presenting the first visual representation of the document without a background, the visual representation including only representations corresponding to HTML elements.

Particular embodiments of the subject matter described in this specification can be implemented to realize one or more of the following advantages. The characteristics of vector objects corresponding to the elements of an HTML document can be independently adjusted. When an element of the HTML document changes, only the vector objects that are derived from that element need be adjusted accordingly—all other vector objects can remain unchanged. Individual vector objects can be programmatically manipulated directly as graphical vector object primitives rather than as HTML elements. The vector objects of HTML elements can be interleaved and mixed with vector object that are not derived from HTML elements, such as the vector objects that are defined in vector-based animation systems. Programmers using a runtime environment can walk the tree of vector objects generated for a given HTML page and serialize those objects to formats such as PDF (Portable Document Format) and SVG (Scalable Vector Graphics). These programmers can also allow a user of their application to manipulate the vector objects with the mouse and keyboard and save those modification in a form that can be sent back to an author of the HTML.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
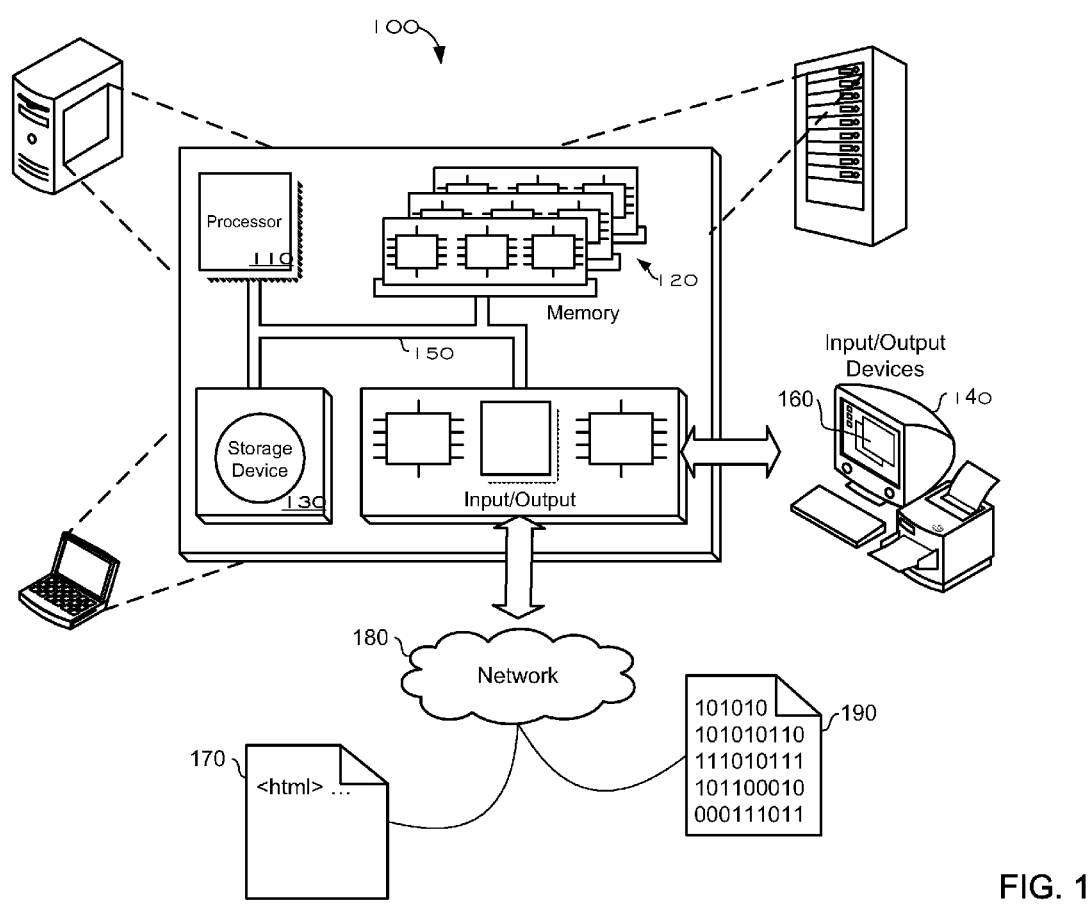
FIG. 1 is a diagram of an example computer system for rendering HTML content.

FIG. 1 is a diagram of an example computer system 100 for rendering HTML content. In some implementations, the rendering of HTML content, as described in detail in reference to FIG. 3, can be implemented in hardware as part of the system 100. The system 100 can include a processor 110, memory 120, a storage device 130, and an input/output device 140. Each of the components 110, 120, 130, and 140 are interconnected using a system bus 150. The processor 110 is capable of processing instructions for execution within the system 100. In one implementation, the processor 110 is a single-threaded processor. In another implementation, the processor 110 is a multi threaded processor. The processor 110 is capable of processing instructions stored in the memory 120 or on the storage device 130 to display graphical information for a user interface on the input/output device 140.

The memory 120 is a computer readable medium such as volatile or non volatile that stores information within the system 100. The memory 120 can store data structures representing HTML content, render trees, vector objects and user interface elements, for example. The storage device 130 is capable of providing persistent storage for the system 100. The storage device 130 may be a floppy disk device, a hard disk device, an optical disk device, or a tape device, or other suitable persistent storage means. The input/output device 140 provides input/output operations for the system 100. In some implementations, the input/output device 140 includes a keyboard and/or pointing device. In other implementations, the input/output device 140 includes a display unit for displaying graphical user interfaces 160.

The system can be connected to a network 180, such as the Internet, an intranet, or an ad hoc network. Information can be accessed and read from the network 180, such as HTML content from an HTML document 170 or a script 190. The HTML document 170 and the script 190 can be independently specified and jointly or separately provided by one or more servers (e.g., a web server or an application server) that are also connected to the network 180. In some implementations the HTML content can be presented in the graphical user interface 160. The HTML content can be made interactive through the execution of the script 190. For example, the script 190 can be used to specify operations that affect the HTML content in response input received from a user using the input/output devices 140. In some implementations, the HTML content is loaded in response to operations carried out by the script 190. In addition, stylesheets can change the rendering of the HTML to change in response to input from a device 140.

Figure 2A:
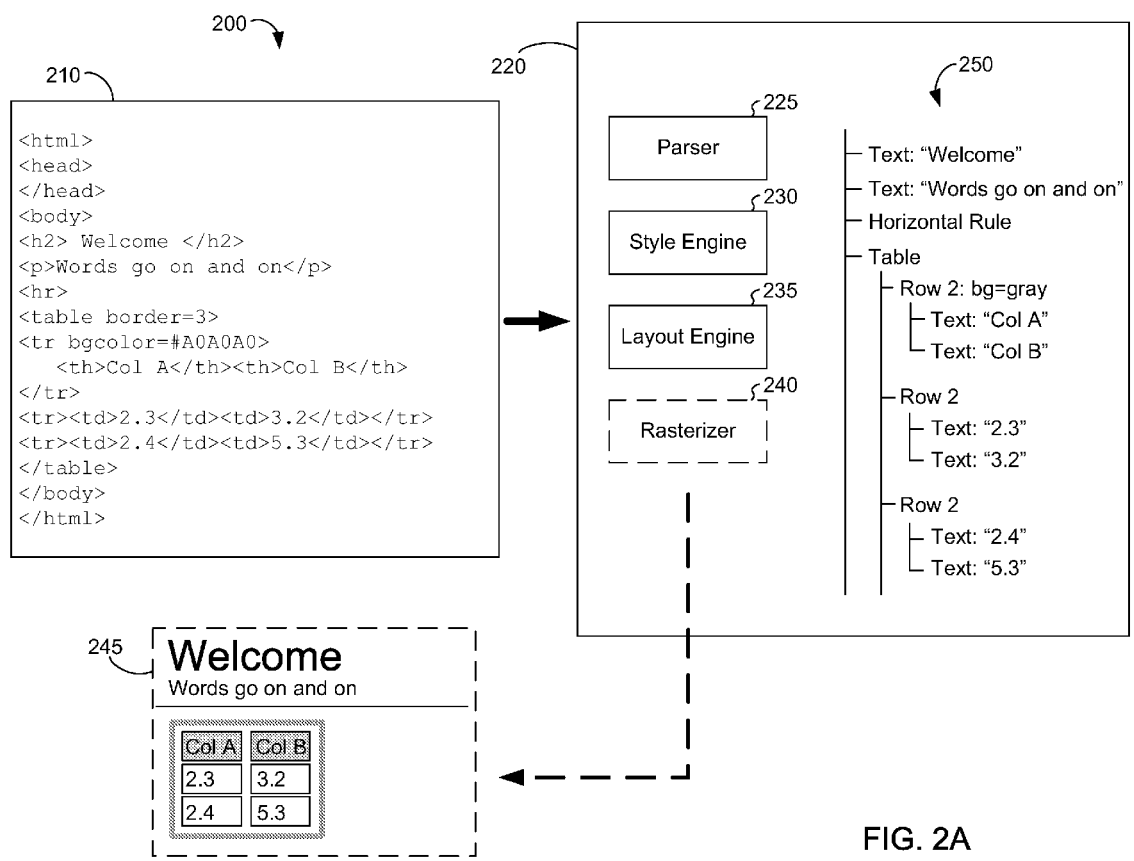
FIG. 2A shows an example system for deriving a render tree from an HTML document.

FIG. 2A shows an example system 200 for deriving a render tree 250 from an HTML document 210. The HTML document 210 is an electronic document, which for brevity will simply be referred to as a document, and which need not necessarily correspond to a particular file. For example, a document can be stored in a portion of a file that holds other documents, in a single file dedicated to the document in question, or in multiple coordinated files.

In general the HTML document 210 is representative of any HTML content whether the content is contained in a file, accessed at a location on a network or contained in a database record. The HTML document 210 shows typical HTML content, a series of HTML elements that are nested and form a hierarchy. The HTML elements (e.g., '<h1>', '<hr>', and '<p>') generally governs the appearance of content in the HTML document 210 when presented visually. For example, the element '<h1>' specifies that content 'Welcome' is to be presented in a larger font than the content 'Words go on and on'. Thus, the HTML elements in HTML content can be said to specify a particular visual representation.

The HTML document 210 is read by an HTML engine 220. The engine 220 includes a parser 225 for reading the HTML document to interpret tags and content. The engine 220 can also include a style engine 230 for reading and applying additional styles to elements specified in the HTML document 210. For example, the style engine can read and interpret a cascading style sheet (CSS) associated with the HTML document. The CSS can be specified within the content of the HTML document or can be specified apart from the HTML document (e.g., in another file or read from a network location).

The engine 220 includes a layout engine 235 for determining the appearance of the HTML document with respect to a display space in which the HTML document is to be rendered and a presented. The layout engine 235 determines, for example, the particular font to use to render the word "Welcome" or how many pixels wide and high a horizontal rule is. The layout engine 235 can also determine the size of elements relative to each other. For example, the layout engine 235 can determine the width of table columns given their respective contents or determine the width of a table that is supposed to be twenty percent of the width of the display area.

From the HTML document 210 the HTML engine 220 derives a render tree 250. The render tree 250 represents the visual appearance of HTML elements. Each item in the render tree corresponds to an HTML element, and each HTML element corresponds to one or more items in the render tree 250. For example, for each line of text in the visual appearance of the HTML document, a rendertext item in the render tree 250 identifies characteristics of the line of text. The characteristics include, for example, the characters of the text, the position of the line of text, the color, font and size of the text. In some implementations, for example, one paragraph element can correspond to multiple rendertext items that each correspond to a single line of text in the paragraph. As another example, visual characteristics such as the boarder of a table can be represented as a renderbox item, which include characteristics such as width, height, background color, border weight, border color and others. Generally, each item in the render tree 250 and their respective characteristics are initially determined by the parser 225, style engine 230 and layout engine 235.

Conventionally, the render tree 250 is used by a rasterizer 240 to generate the visual representation 245, typically, for presentation on a display device or print device. Each time the visual representation is presented, the rasterizer 240 rasterizes the render tree 250 and regenerates the visual representation 245. Whenever the visual representation 245 needs to be changed, for example because an element of the HTML document has changed (e.g., because of a running script has changed an attribute of an HTML element) or because the physical characteristic of the display space has changed, the render tree 250 is accordingly changed or regenerated by the HTML engine 220. The updated render tree 250 is then, in turn, rasterized to generate an updated visual representation. Instead of rasterizing the render tree, however, the render tree can be used to derive a hierarchy of vector objects.

Figure 2B:
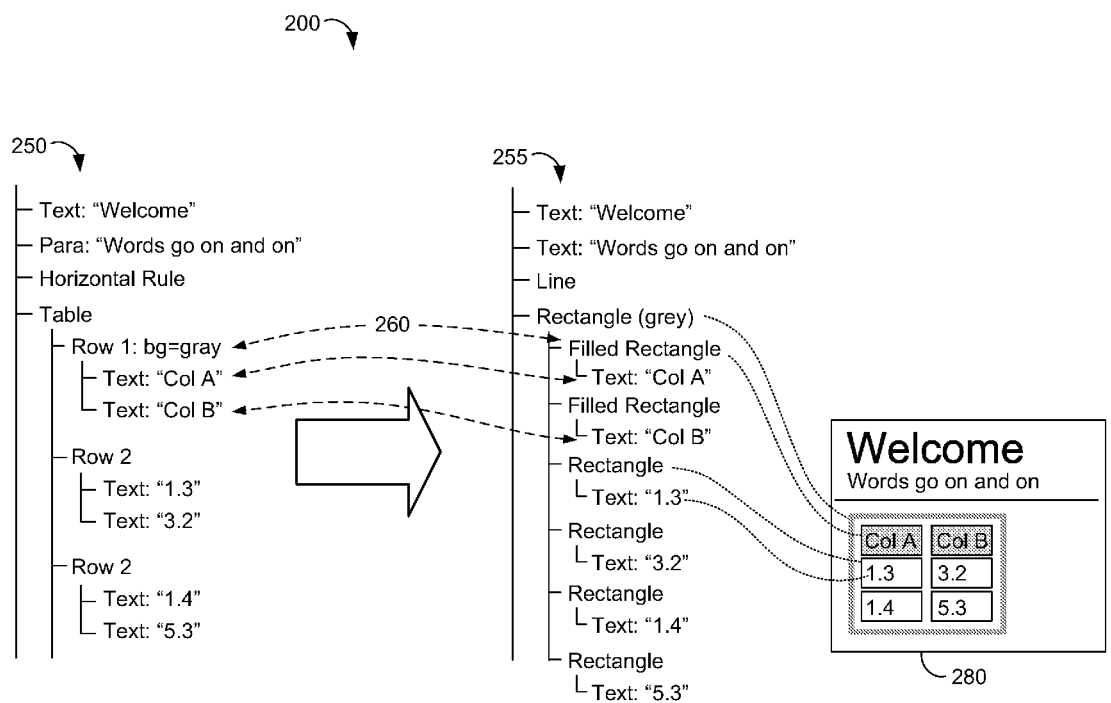
FIG. 2B shows the example system wherein a render tree is translated into a hierarchy of vector objects.

FIG. 2B shows the system 200 wherein a render tree 250 is translated into a hierarchy of vector objects 255. The items in the render tree 250 correspond to elements of HTML content. The items in the render tree 250 can be readily manipulated according to the adjustable properties of HTML elements. For example, both the color of text or the weight of a line are appropriate characteristics of an HTML element that be specified in HTML attributes or CSS attributes. These characteristics correspond to properties of the items in the render tree. Items in the render tree, however, cannot readily be manipulated in a more general fashion. Instead, render tree 250 can be translated into a hierarchy of vector objects 255.

Each vector object in the hierarchy of vector objects 255 corresponds to common graphical object primitives such as points, lines, text runs, filled and unfilled rectangle, filled and unfilled ovals, and other embedded objects (e.g., sprites, images, video, applets or other applications). Compared to items in the render tree 250, a vector object represents a more fine-grained element of a visual representation of an HTML document. Therefore, each item in the render tree 250 may correspond to multiple vector objects in the hierarchy of vector objects. For example, one cell in an HTML table can be expressed as filled rectangle and a run of text.

Each vector object in the hierarchy of vector objects 255 has characteristics typical of vector objects including color and position. In some implementations, each vector object is associated with a transparency value specifying to what degree a vector object should be rendered fully or partially opaque. Each vector object can further be subject to additional transformations that can be used to affect a particular vector object's visual appearance. For example, each vector object can be associated with a scale, rotation or sheer transformation. In some implementation, each object can be subject to any arbitrary two-dimensional or three-dimensional transformation. An object can be associated with such transformations such that the associated object alone, and no other object, is affected by the transformation.

The hierarchy of vector objects 255 can be rendered to generate a visual representation 280 of the HTML document. Despite changes to HTML elements in response to modification requests, the same hierarchy of vector objects can be used for as long as presentation of the HTML content is desired. When an HTML element is changed corresponding modifications to vector objects in the hierarchy can be made. The hierarchy can be reused to render an updated visual representation which depicts the requested modifications.

Although the visual representation 280 of the hierarchy can appear identical to the conventional visual representation 245 of the render tree, the hierarchy of vector objects 255 can be used to generate visual representation that would otherwise not be possible using only a render tree. For example, the HTML document (or any part thereof) can be scaled such that the HTML document appears to be zoomed in or out. This operation can be carried out without regenerating either the render tree 250 or the hierarchy of vector objects 255. Instead, the hierarchy of vector objects 255 need only be rendered using an adjusted scale transformation.

Associations 260 between items in the render tree 250 and corresponding vector objects in the hierarchy 255 can be established. These associations can be used to modify vector objects when items in the render tree 250 are altered or adjusted (e.g., in response to a running script or input from an input device 140). For example, if the background color of a table cell is changed from gray to blue, then the filled rectangle vector object that represents the background color of the table cell can be changed accordingly.

Figure 3:
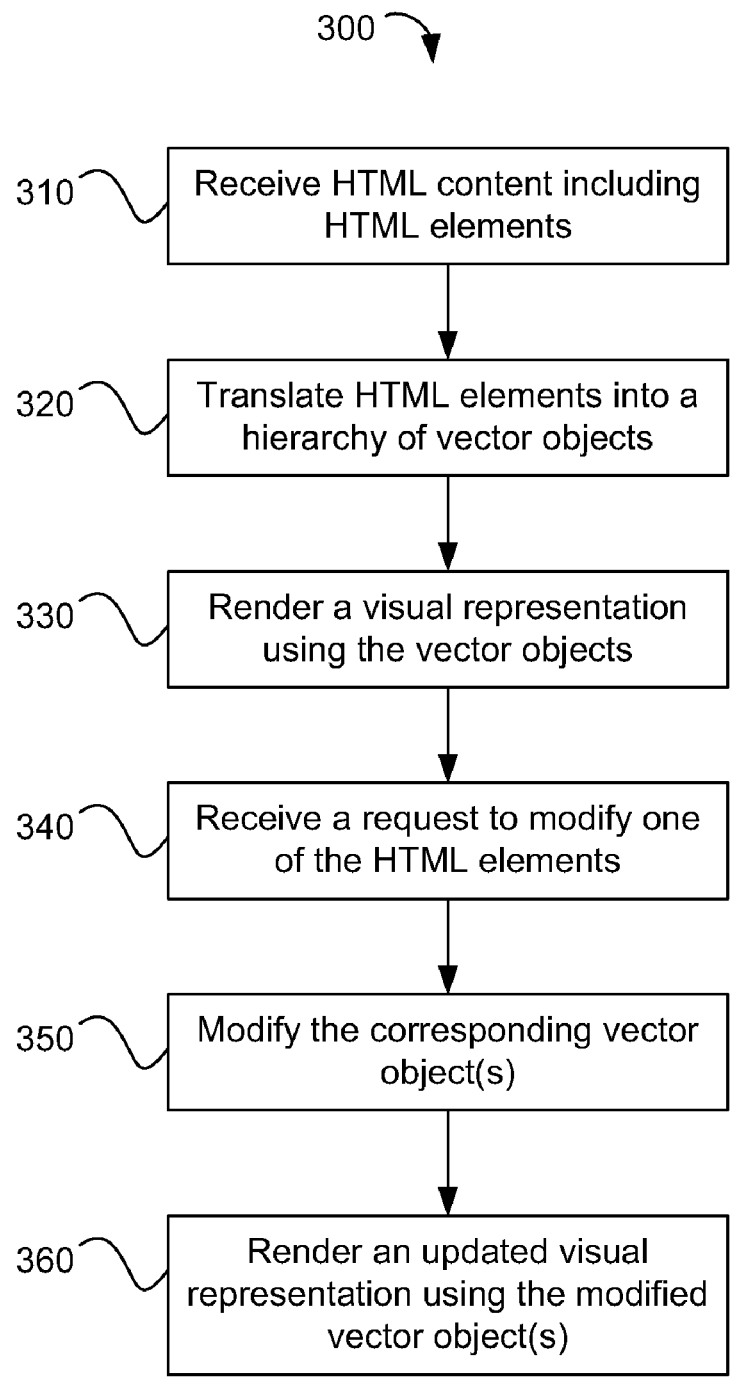
FIG. 3 shows an example process for generating a hierarchy of vector objects derived from an HTML document.

FIG. 3 shows an example process 300 for generating a hierarchy of vector objects derived from an HTML document. For convenience, the process 300 will be described with reference to a system that performs the process 300. The system receives 310 HTML content including HTML elements. In some implementations, the HTML content is specified by a location accessed over a network or provided by a web server. In other implementations, HTML content is stored in a file on a local storage device, embedded in another document (e.g., a word processing document, an e-mail message or an instant message) or retrieved from a database. In some implementations, the HTML is parsed and analyzed to derive a corresponding render tree.

The system translates 320 the HTML into a hierarchy of vector objects. In some implementations, the render tree can be translated into a hierarchy of vector objects. Each item in the render tree can be decomposed into one or more corresponding vector objects in the hierarchy of vector objects. In other implementations, the hierarchy of vector objects can be generated directly from the HTML content without the use of the render tree.

The hierarchy of vector objects is used to render 330 a visual representation of the HTML content. Each vector object in the hierarchy of objects is associated with properties describing the position of the vector object with respect to the other objects in the hierarchy. A viewport can be used to select which vector objects in the hierarchy are rendered to a display space based on the position of the viewport relative to the vector objects. The viewport can correspond to the logical or physical dimensions of the display space. For example, the viewport can be configured to select vector objects that have a visual representation in a region that is 400 pixels wide by 400 pixels high from a particular offset relative to the most top-left object in the hierarchy.

The system receives 340 a request to modify an HTML element defined in the HTML content. In some implementations, the request to modify the HTML element originates from a script running in conjunction with the presentation of the content. For example, the HTML can be accessed and manipulated by a running script (e.g., JavaScript, VBscript or ActionScript). The request specifies a particular HTML element and the desired change (e.g., adjust the foreground color of a border, alter the font of a line of text or alter the text being displayed in a rendertext item). The HTML element that is the subject of the modification request is used to identify an item in the render tree. Properties of the identified item are changed accordingly. In some implementations, the adjustment of the render tree in response to such requests can occur automatically by an HTML engine, as described in reference to FIG. 4.

The system modifies 350 the vector objects that correspond to the identified item in the render tree. Typically the hierarchy of vector objects is modified rather than reconstructed or regenerated in response to such modifications. Using a persistent hierarchy of vector objects when rendering HTML content can be more efficient than rasterizing the render tree repeatedly.

In some implementations, associations between items in the render tree and vector objects in the hierarchy can be used to identify the vector object affected by the modification request. An association related to the affected item in the render tree can be followed to identify corresponding vector objects. The properties of the identified vector object are modified according to the particulars of the modification request. In some cases, multiple properties of multiple vector objects are changed in response to the modification of an item in the render tree.

In other implementations, associations between items in the render tree and vector objects in the hierarchy may not exist. In such implementations, it may be inefficient or inconvenient to determine which vector object would be affected by the modification request. Instead, the item in the render tree affected by the modification can be used to generate new vector objects that are added to the hierarchy of objects. A clipping region can be created and added to the hierarchy as a vector object, or as a property of an existing display object in the hierarchy. The clipping region occludes at least the vector object that would be changed by the modification request. The size and position of the clipping region can be determined by calculating the dimensions of a bounding box of the item affected by the request. In some implementations, the clipping region can be arbitrarily sized and shaped such that the clipping region need not cover an exactly rectangular region.

In some implementations, vector objects in the hierarchy can be associated with a depth order value or a Z-value. The depth order value of a vector object describes the order of an object with respect to other objects in the hierarchy. The depth ordering of objects determines which objects overlap and occlude (or partially occlude) other objects. For example, a first object may have a depth value lower than a second object. If the two objects share some of the same area of the display space then the first object is occluded and overlapped by the second object. Presuming that the second object is opaque, rather than semi-transparent, the occluded portion of the first object would not be visible in a visual representation of both objects. When the clipping region is added to the hierarchy, the clipping region can be assigned a depth value such that it overlaps other vector objects, in particular the object that would be modified by the modification request. Thus, the vector objects that would be affected by the modification request are occluded by the clipping region and are thus prevented from appearing in a visual representation of the hierarchy. Alternatively, a display object in the hierarchy that corresponds to the root of the HTML rendering can be located, and the clipping region can be added to a property of this display object (e.g., a non-null clipping mask property can be assigned to the display object corresponding to the root of the HTML rendering).

Since the vector object that would have been affected by the modification request has now been hidden by the clipping region, another new vector object is generated to represent the affected item. This new vector object is assigned properties such that when rendered, the new vector object will have a visual appearance consistent with the requested modification. The new vector object overlaps the clipping region such that the new vector object is not occluded by the clipping region. In some cases, the clipping region may cover vector objects that were not affected by the modification request. New vector objects can be created for each of these covered vector object to effectively restore their appearance in the visual representation.

The hierarchy of vector objects, including the modified vector object, is rendered 360 to generate (or refresh) the visual representation of the HTML content. In some implementations, the visual representation can be generated by rendering only the portion of the hierarchy of objects that has been modified. Thus, using the hierarchy of objects to render HTML content that is being altered by successive modification requests can be more efficient and flexible than repeatedly rasterizing an associated render tree. The regenerated visual representation depicts the HTML element according to the requested modification. For example, if the requested modification specified that the color of a line of text be changed from black to red, then the corresponding text vector object in the hierarchy is modified such that its color property is set to red. In the new visual representation of the hierarchy of vector objects, the subject text appears red.

Figure 4:
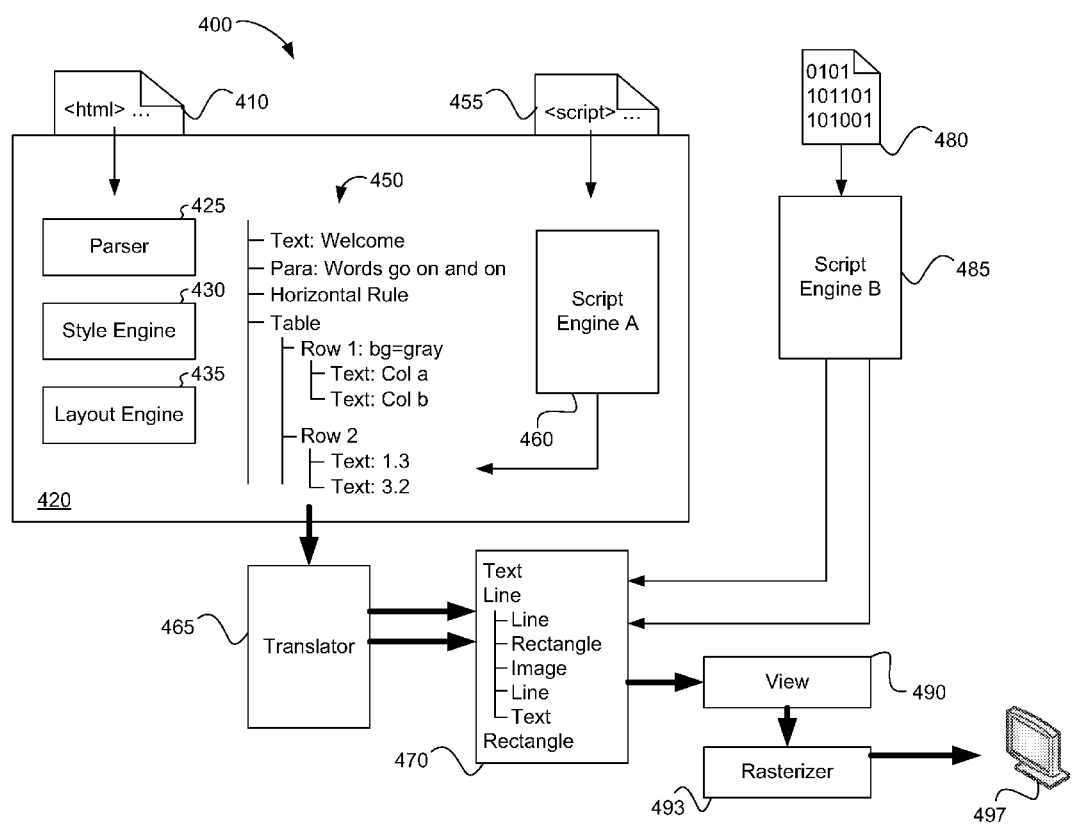
FIG. 4 shows an example system for manipulating a hierarchy of vector objects derived from an HTML document.

FIG. 4 shows an example system 400 for manipulating a hierarchy of vector objects derived from HTML content 410. The system 400 includes an HTML engine 420. The HTML engine includes a parser 425, style engine 430 and layout engine 435. These components correspond to the similarly named components referred to in FIG. 1. The HTML engine 420 reads HTML content 410 to generate a render tree 450. The HTML engine 420 can also include a first script engine 460. The first script engine 460 can be used to run a first script 455 that can request modifications to HTML elements specified in the HTML content 410. The script requests modifications that concern properties of an HTML elements and thus, such a script would not generally make (or be allowed to make) arbitrary modification requests as if the element were a vector object.

In particular, first script 455 typically refers to individual HTML elements by referring to elements in a document object model (DOM). A request to alter an HTML element or DOM element can cause multiple items in the render tree 450 to be updated. In some implementations, a script can even add HTML elements by specifying new HTML content that can be injected into the current HTML content. Such modifications can cause additional items to be added to a render tree and corresponding vector objects to be added to the hierarchy of vector objects. Note that the DOM is a documented standardized interface that HTML rendering engines support, whereas the render tree can be an underlying data structure and interface used by an HTML rendering engine to implement rendering of the DOM.

A translator 465 is used to translate each item in the render tree 450 into corresponding vector objects in a hierarchy of vector objects 470. The hierarchy of vector objects 470 is a persistent representation of the HTML content. When any HTML element is modified, the properties of corresponding vector objects can be modified rather than regenerating the entire hierarchy of objects from scratch. Thus, the translator 465 generates and then subsequently manipulates the hierarchy of vector objects 470 for as along as a representation of the HTML content is required.

In some implementations, the translator 465 can be used to regenerate the hierarchy of vector objects 470 from scratch rather than modifying an existing hierarchy. For example, consider an implementation using the clipping-region approach described above where, to effect change in the visual representation of the HTML content, a clipping region and new vector objects are layered over existing vector objects. After multiple modifications to the HTML content a significant number of clipping regions and vector objects may have been added to the hierarchy of vector objects. In some cases, particularly when the same HTML element is repeatedly modified, stacks of vector objects covered by multiple clipping regions can build up as modification requests are carried out over time. So as to effectively remove vector objects that are completely occluded by clipping regions, the hierarchy of vector objects can be regenerated from scratch on a periodic basis (e.g., after a specified number of modification requests).

A view component 490 defines a viewport. A viewport is sometimes referred to as a view window or a viewing volume. The view component 490 maintains the viewport based on a portion (e.g., a page) of the visual representation of the HTML content that is being rendered with respect to the entire visual representation of the HTML. Therefore, the viewport specifies what portion of the hierarchy of objects 470 is used by a rasterizer 493 for generating visual representations for presentation on an output device 497 (e.g., a display device, an output image or a print device). In some implementations, the properties of vector objects, in particular, their position with respect to other vector objects can be determined based on the position of the viewport. The determination can be a remapping of their relative position as determined by a layout engine. For example, consider an given element having a relative height position expressed as the value two-hundred. When a viewport is positioned to display vector objects having a height value between fifty and one-hundred, the relative height position of the given element can be translated from two-hundred to one-hundred-fifty. When the viewpoint is reposition to display vector objects having a height value between two-hundred and two-hundred-fifty, the relative height of the vector object can be remapped to zero (e.g., corresponding to the top-left corner of a display space).

For HTML content that is voluminous, the magnitude of values used to describe the position of vector objects near the bottom of the HTML document may exceed the data storage used to store vector object positions. In some implementations, vector objects in the hierarchy that are sufficiently far away from the current position of the viewport can be clipped, such that their position with respect to other vector objects are not determined at all. As the viewport is moved, these clipped objects can be reconsidered to determine whether they are close to or appear in the viewport, at which time their positions relative to the position of viewport can be determined.

The system 400 can also include a second script engine 485 capable of running a second script 480. The second script 480 is distinct from the first script 455. The second script 480, running in the second script engine 485 can be allowed to directly manipulate the hierarchy of vector objects 470. The manipulations include adding vector objects, removing vector objects or adjusting the properties of existing vector objects. Such manipulations by the second script 480 can be unrelated to and need not identify the HTML elements to which a vector object corresponds. When the second script 480 adds vector objects to the hierarchy, the vector object is specified by the second script 480 and need not have a corresponding representation in the HTML content 410 or any other HTML content. For example, the script 480 can be an Adobe Flash® file including ActionScript or Shockwave Flash (SWF), available from Adobe Systems Incorporated. Such scripts can have associated vector-object images or animations. These vector objects can be added directly to the hierarchy of vector objects 480.

Note that although the second script engine 485 is represented in the system 400 as a separate entity apart from the first script engine 460, this is merely convenient for illustrative purposes. In some implementations, the first engine 460 and second script engine 480 can be implemented as a single script engine, which need not be included in the HTML engine 420. In such implementations, a combined script engine can run the second script 480 which, as described above, can directly manipulate the hierarchy.

The combination of the vector objects associated with the HTML content 410 and vector objects created (and thus associated) with the second script 480 can be used to generated visual representations that would otherwise not be possible without a hierarchy that included both types of vector objects.

Figure 5A:
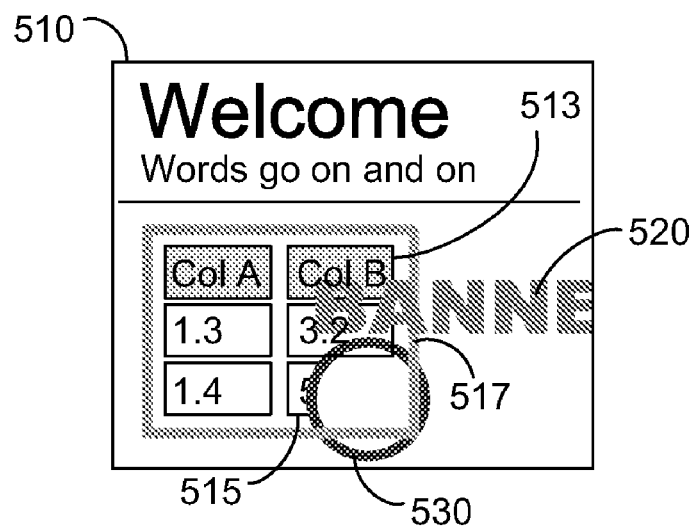
FIGS. 5A and 5B show examples of visual effects made possible using vector objects to render HTML documents.
Figure 5B:
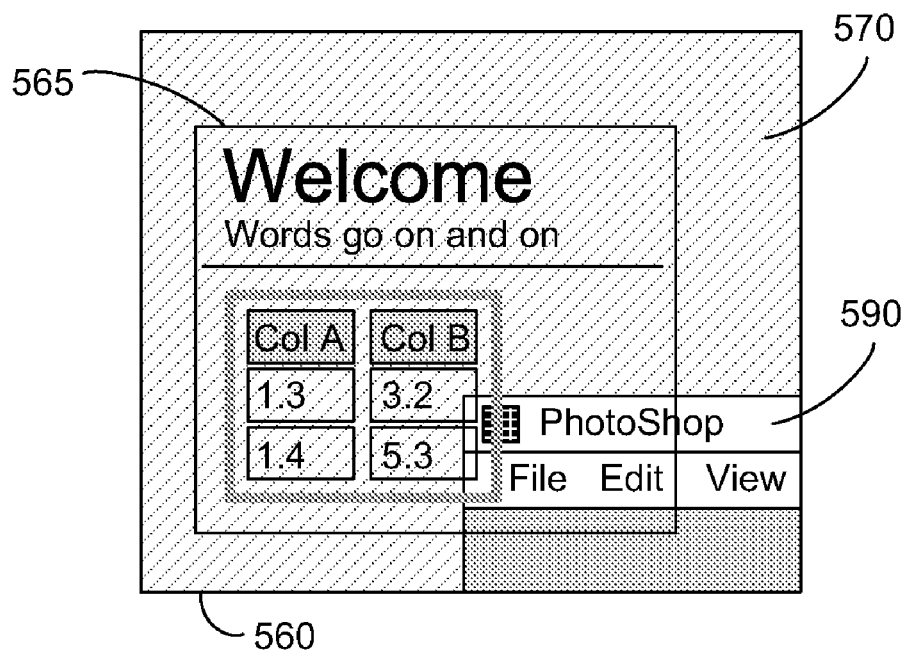

FIGS. 5A and 5B show examples of visual effects made possible using vector objects to render HTML documents. A visual representation 510 shows vector objects corresponding to HTML elements—for the sake of clarity these vector objects are hereafter referred to as HTML-derived vector objects. For example, the HTML-derived vector objects include the filled rectangle 513 and 515, which both correspond to the border of data cells in a table, and the unfilled rectangle 517, which represents a border of the same table. Another vector object, which does not correspond to any HTML element, is shown inserted between the HTML-derived vector objects. For example, the filled circle 530 is shown overlapping and therefore occluding the filled rectangle 515 while being overlapped by the unfilled rectangle 517. The filled circle 530 in effect appears to be inserted between these individual objects. In some implementations, this effect is achieved through the addition of the vector object 530 to the hierarchy and the respective depth order of each vector object in the hierarchy. Similarly, the text 520 represents another vector object inserted between the filled rectangle 515 and the text vector objects which represent the text in cells of the table. Both the text 520 and the filled circle 530 are vector objects that were created and added to the hierarchy of vector objects in response to requests made by a script or application specified apart from the HTML content from which the other vector objects are derived.

In FIG. 5B, a display space 560 shows a visual representation 565 of vector objects that correspond to HTML content. The display space 560 shows the visual representation 565 being rendered in a graphical user interface that includes a desktop 570 (e.g., a wallpaper, or background image) and visual representations (e.g., windows) of other applications 590 being presented in the graphical user interface. The HTML content is rendered using a hierarchy of vector objects such that the visual representation 565 appears to have no background. When the vector objects are rendered without a background other components of the graphical user interface appear through unfilled portions visual representation 565. For example, the window of the other application 590, which corresponds to another application that has a visual representation in the graphical user interface, appears behind the visual representation 565 of the vector objects. Typically, HTML content is rendered using a default background (e.g., a solid color or pattern specified by a web browser) or alternative using a background color, image or pattern specified within the HTML content. Such a background can be represented in the hierarchy of vector objects as a background vector object. The background vector object can be a solid filled rectangle (or other shape) or can be a vector object for presenting a given image. In some implementations, the HTML content can include a declarative statement indicating that a fully or partially transparent background should be used rather than a solid color or image. The declarative statement (e.g., 'bg=transparent' in the HTML content, such as, '<BODY bgcolor='transparent'>'), can be parsed and recognized as a request to not add the background vector object to the hierarchy of vector objects.

In some implementations, the visual representation of HTML content that is rendered without a background can appear in a graphical user interface as an application with a non-rectangular window shape. Given that there is no background, the apparent edge of the application window is dependant on the opaque or partially opaque vector objects in the hierarchy. The shape of the window can appear as any arbitrary shape (e.g., an oval, a polygon, a curve or a combination thereof). When the background is set to be semi-transparent, the appearance of the application can appear to be semi-transparent.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

The invention claimed is:

1. A computer-implemented method comprising:
receiving a document specifying a hierarchy of hypertext markup language (HTML) elements, each HTML element having a representation in a first visual representation of the document;
translating the HTML elements into a hierarchy of vector object primitives, at least one of the HTML elements being translated into a corresponding vector object primitive;
generating the first visual representation of the document by rendering the hierarchy of vector object primitives;
ordering the vector object primitives in the hierarchy of vector object primitives based on relative depth, a first vector object primitive in the hierarchy being above or under a second vector object primitive in the hierarchy;
inserting a third vector object primitive into the hierarchy of vector object primitives, the third vector object primitive being under at least one vector object primitive in the hierarchy, the third vector object primitive being specified in a document different from the document specifying the hierarchy of HTML elements; and
generating a second visual representation using the third vector object primitive and the hierarchy of vector object primitives, a representation of the third vector object primitive in the second visual representation being at least partially occluded by a representation of the at least one vector object primitive in the hierarchy.

2. The method of claim 1, further comprising:
receiving a requested modification to the hierarchy of HTML elements, the requested modification to the hierarchy of HTML elements representing a second visual representation of the document;
modifying the hierarchy of vector object primitives based on the one or more modifications; and
generating the second visual representation of the document by rendering the hierarchy of vector object primitives.

3. The method of claim 2, wherein generating the second visual representation of the document by rendering the hierarchy of vector object primitives comprises rendering only that portion of the hierarchy of vector object primitives affected by the requested modification.

4. The method of claim 1, further comprising:
receiving a request to modify a vector object primitive in the hierarchy of vector object primitives;
in response to the request, modifying the vector object primitive; and
generating a second visual representation using the hierarchy of vector object primitives.

5. The method of claim 2, wherein modifying the hierarchy of vector object primitives further comprises:
identifying HTML elements in the hierarchy of HTML elements affected by the requested operation; and
modifying the vector object primitives in the hierarchy of vector objects primitives corresponding to the HTML elements in the hierarchy of HTML elements that would be affected by the requested operation.

6. The method of claim 1, further comprising:
translating a respective position of each of the vector object primitives based on a position of a viewport, the position of the viewport being relative to a position of the vector objects.

7. The method of claim 2, wherein modifying the hierarchy of vector object primitives further comprises:
adding a clipping region to the hierarchy of vector object primitives, the clipping region preventing the vector object primitives affected by the requested modification from having a representation in the second visual representation of the document;
adding new vector object primitives to the hierarchy of vector object primitives, the new vector object primitives corresponding to the HTML elements affected by the requested operation; and
using the new vector object primitives for generating the second visual representation.

8. The method of claim 1, further comprising:
identifying a declaration for generating the first visual representation of the document without a background; and
presenting the first visual representation of the document without a background, the visual representation including only representations corresponding to HTML elements.

9. A non-transitory computer-readable medium encoding a computer program product operable to cause data processing apparatus to perform operations comprising:
receiving a document specifying a hierarchy of hypertext markup language (HTML) elements, each HTML element having a representation in a first visual representation of the document;
translating the HTML elements into a hierarchy of vector object primitives, at least one of the HTML elements being translated into a corresponding vector object primitive;
generating the first visual representation of the document by rendering the hierarchy of vector object primitives;
ordering the vector object primitives in the hierarchy of vector object primitives based on relative depth, a first vector object primitive in the hierarchy being above or under a second vector object primitive in the hierarchy;
inserting a third vector object primitive into the hierarchy of vector object primitives, the third vector object primitive being under at least one vector object primitive in the hierarchy, the third vector object primitive being specified in a document different from the document specifying the hierarchy of HTML elements; and
generating a second visual representation using the third vector object primitive and the hierarchy of vector object primitives, a representation of the third vector object primitive in the second visual representation being at least partially occluded by a representation of the at least one vector object primitive in the hierarchy.

10. The non-transitory computer-readable medium of claim 9, the operations further comprising:
receiving a requested modification to the hierarchy of HTML elements, the requested modification to the hierarchy of HTML elements representing a second visual representation of the document;

modifying the hierarchy of vector object primitives based on the one or more modifications; and
generating the second visual representation of the document by rendering the hierarchy of vector object primitives.

11. The non-transitory computer-readable medium of claim 10, wherein generating the second visual representation of the document by rendering the hierarchy of vector object primitives comprises rendering only that portion of the hierarchy of vector object primitives affected by the requested modification.

12. The non-transitory computer-readable medium claim 10, wherein modifying the hierarchy of vector object primitives further comprises:
identifying HTML elements in the hierarchy of HTML elements affected by the requested operation; and
modifying the vector object primitives in the hierarchy of vector objects primitives corresponding to the HTML elements in the hierarchy of HTML elements that would be affected by the requested operation.

13. The non-transitory computer-readable medium of claim 10, wherein modifying the hierarchy of vector object primitives further comprises:
adding a clipping region to the hierarchy of vector object primitives, the clipping region preventing the vector object primitives affected by the requested modification from having a representation in the second visual representation of the document;
adding new vector object primitives to the hierarchy of vector object primitives, the new vector object primitives corresponding to the HTML elements affected by the requested operation; and
using the new vector object primitives for generating the second visual representation.

14. The non-transitory computer-readable medium of claim 9, the operations further comprising:
translating a respective position of each of the vector object primitives based on a position of a viewport, the position of the viewport being relative to a position of the vector objects.

15. The non-transitory computer-readable medium of claim 9, the operations further comprising:
identifying a declaration for generating the first visual representation of the document without a background; and
presenting the first visual representation of the document without a background, the visual representation including only representations corresponding to HTML elements.

16. The non-transitory computer-readable medium of claim 9, the operations further comprising:
receiving a request to modify a vector object primitive in the hierarchy of vector object primitives;
in response to the request, modifying the vector object primitive; and
generating a second visual representation using the hierarchy of vector object primitives.

17. A system comprising:
a user interface device; and
one or more computers operable to interact with the user interface device and to perform operations comprising:
receiving a document specifying a hierarchy of hypertext markup language (HTML) elements, each HTML element having a representation in a first visual representation of the document;
translating the HTML elements into a hierarchy of vector object primitives, at least one of the HTML elements being translated into a corresponding vector object primitive;
generating the first visual representation of the document by rendering the hierarchy of vector object primitives;
ordering the vector object primitives in the hierarchy of vector object primitives based on relative depth, a first vector object primitive in the hierarchy being above or under a second vector object primitive in the hierarchy;
inserting a third vector object primitive into the hierarchy of vector object primitives, the third vector object primitive being under at least one vector object primitive in the hierarchy, the third vector object primitive being specified in a document different from the document specifying the hierarchy of HTML elements; and
generating a second visual representation using the third vector object primitive and the hierarchy of vector object primitives, a representation of the third vector object primitive in the second visual representation being at least partially occluded by a representation of the at least one vector object primitive in the hierarchy.

18. The system of claim 17, the operations further comprising:
receiving a requested modification to the hierarchy of HTML elements, the requested modification to the hierarchy of HTML elements representing a second visual representation of the document;
modifying the hierarchy of vector object primitives based on the one or more modifications; and
generating the second visual representation of the document by rendering the hierarchy of vector object primitives.

19. The system of claim 18, wherein generating the second visual representation of the document by rendering the hierarchy of vector object primitives comprises rendering only that portion of the hierarchy of vector object primitives affected by the requested modification.

20. The system of claim 18, wherein modifying the hierarchy of vector object primitives further comprises:
identifying HTML elements in the hierarchy of HTML elements affected by the requested operation; and
modifying the vector object primitives in the hierarchy of vector objects primitives corresponding to the HTML elements in the hierarchy of HTML elements that would be affected by the requested operation.

21. The system of claim 18, wherein modifying the hierarchy of vector object primitives further comprises:
adding a clipping region to the hierarchy of vector object primitives, the clipping region preventing the vector object primitives affected by the requested modification from having a representation in the second visual representation of the document;
adding new vector object primitives to the hierarchy of vector object primitives, the new vector object primitives corresponding to the HTML elements affected by the requested operation; and
using the new vector object primitives for generating the second visual representation.

22. The system of claim 17, the operations further comprising:
receiving a request to modify a vector object primitive in the hierarchy of vector object primitives;
in response to the request, modifying the vector object primitive; and
generating a second visual representation using the hierarchy of vector object primitives.

23. The system of claim 17, the operations further comprising:
  translating a respective position of each of the vector object primitives based on a position of a viewport, the position of the viewport being relative to a position of the vector objects.

24. The system of claim 17, the operations further comprising:
  identifying a declaration for generating the first visual representation of the document without a background; and presenting the first visual representation of the document without a background, the visual representation including only representations corresponding to HTML elements.

25. The system of claim 17, wherein the one or more computers comprises one personal computer, and the personal computer comprises the user interface device.

\* \* \* \* \*